US012205249B2

(12) United States Patent
Sun

(10) Patent No.: US 12,205,249 B2
(45) Date of Patent: Jan. 21, 2025

(54) INTELLIGENT PORTRAIT PHOTOGRAPHY ENHANCEMENT SYSTEM

(71) Applicant: Apple Inc., Cupertino, CA (US)

(72) Inventor: Libin Sun, Redwood City, CA (US)

(73) Assignee: Apple Inc., Cupertino, CA (US)

( * ) Notice: Subject to any disclaimer, the term of this patent is extended or adjusted under 35 U.S.C. 154(b) by 441 days.

(21) Appl. No.: 17/805,071

(22) Filed: Jun. 2, 2022

(65) Prior Publication Data

US 2022/0398704 A1 Dec. 15, 2022

Related U.S. Application Data

(60) Provisional application No. 63/208,841, filed on Jun. 9, 2021.

(51) Int. Cl.
*G06T 5/30* (2006.01)
*G06T 7/194* (2017.01)

(52) U.S. Cl.
CPC ................ *G06T 5/30* (2013.01); *G06T 7/194* (2017.01); *G06T 2207/20084* (2013.01); *G06T 2207/20212* (2013.01)

(58) Field of Classification Search
CPC . G06T 5/30; G06T 7/194; G06T 2207/20084; G06T 2207/20212
See application file for complete search history.

(56) References Cited

U.S. PATENT DOCUMENTS

| 2020/0082535 | A1 | 3/2020 | Lindskog |
| 2020/0242788 | A1 | 7/2020 | Jacobs |
| 2021/0012503 | A1* | 1/2021 | Cho ........................ G06F 18/24 |
| 2021/0073953 | A1* | 3/2021 | Lee ......................... G06N 3/084 |
| 2021/0142455 | A1 | 5/2021 | Hsiao |

OTHER PUBLICATIONS

Ignatov, "Rendering Natural Camera Bokeh Effect with Deep Learning," arXiv:2006.05698v1, Jun. 10, 2020.
(Continued)

*Primary Examiner* — Amandeep Saini
*Assistant Examiner* — Helen Deng Shi
(74) *Attorney, Agent, or Firm* — Blank Rome LLP

(57) ABSTRACT

Devices, methods, and non-transitory program storage devices are disclosed to provide enhanced synthetic Shallow Depth of Field (SDOF) images, e.g., by using information from images captured by image camera devices and one or more Deep Neural Networks (DNNs) trained to determine how much blurring should be applied to pixels in a mask region (e.g., a region of pixels having an indeterminate foreground or background status and threshold level of gradient magnitude) within an image, given context from surrounding pixels in a reference image and/or an unenhanced synthetic SDOF image. To train the DNNs, various sets of ground truth DSLR images of static scenes, captured at varying aperture settings, may be analyzed. Preferably, such static scenes cover many examples of human subjects (or other objects of interest) with different amounts of scene foreground/background separation, lighting conditions, and various kinds of hair, fabric, or other fine-grained details occurring near their foreground/background transition.

20 Claims, 7 Drawing Sheets

(56) References Cited

OTHER PUBLICATIONS

Kang, et al., "Intelligent Autofocus with Adaptive Depth of Field," MVA 2015 IAPR International Conference on Machine Vision Applications, May 2015.
Karras, et al., "Progressive Growing of GANs for Improved Quality, Stability, and Variation," arXiv:1710.10196v3, Feb. 26, 2018.
Wang, et al., "DeepLens: Shallow Depth Of Field From A Single Image," arXiv:1810.08100v1, Oct. 18, 2018.
Zhu, et al., "Unpaired Image-to-Image Translation using Cycle-Consistent Adversarial Networks," arXiv:1703.10593v7, Aug. 24, 2020.

* cited by examiner

INTELLIGENT PORTRAIT PHOTOGRAPHY ENHANCEMENT SYSTEM

TECHNICAL FIELD

This disclosure relates generally to the field of digital image processing. More particularly, but not by way of limitation, it relates to machine learning (ML) techniques for achieving enhanced quality in the appearance of synthetic Shallow Depth of Field (SDOF) images, e.g., portrait images, formed from images captured by a non-SDOF image capture device.

BACKGROUND

The advent of mobile, multifunction devices, such as smartphones and tablet devices, has resulted in a desire for small form factor cameras capable of generating high levels of image quality in near-real time for integration into such mobile, multifunction devices. Increasingly, as users rely on these multifunction devices as their primary cameras for day-to-day use, users demand features and image quality levels that they have become accustomed to from the use of dedicated-purpose camera devices.

In particular, SDOF or so-called "portrait" image captures on mobile, multifunction devices have become an integral part of user experience. However, the perceptual quality of portrait image captures from mobile, multifunction camera devices often falls short of what consumer-grade or pro-grade dedicated-purpose cameras, e.g., digital single-lens reflex (DSLR) cameras, can achieve. Specifically, portrait mode image captures are typically rendered synthetically on-device by computational photography algorithms, leveraging input signals such as RGB image data, estimated depth data, and/or segmentation/alpha matting information, etc., which typically exhibit various degrees of artifacts. Further, because such synthetic SDOF rendering algorithms rely upon an approximation of the captured scene's underlying physics, it is possible that even further visual artifacts may be introduced into the final rendered synthetic SDOF/portrait mode image.

Such artifacts may typically occur near depth discontinuities in the captured scene, such as hairs or other fine image details near the foreground/background boundary in the captured scene, as shown in FIG. 1B. Even assuming that accurate, high-resolution "ground truth" depth information for a given captured scene is known, successfully modeling the physics of hair strands (or other fine details) and rendering perceptually-realistic shallow depth-of-field effects on such hair strands (or other fine details) remains costly and challenging, especially in a processing-constrained and/or time-constrained setting, such as on a smartphone. As a result, smartphone portrait images often have a lower perceptual quality level than portrait photography produced by DSLR cameras paired with a high quality lens, wherein hair strands and other fine details are always rendered perfectly because the image data is captured via actual photons and physics—instead of computation or simulation.

Thus, it would be beneficial to have methods and systems that bring enhanced, i.e., DSLR-like, quality to portrait mode photography on smartphones and other mobile multifunction camera devices—without the need for expensive and bulky equipment, such as DSLR cameras or fast prime lenses.

SUMMARY

Devices, methods, and non-transitory program storage devices are disclosed herein to provide enhanced images, especially in portrait photography scenarios, e.g., by leveraging deep neural networks (DNNs) and machine learning (ML) to deploy a trained model on mobile, multifunction camera devices to produce more "realistic" (e.g., DSLR-level quality) portrait photography on demand and in a computationally-efficient manner.

In one embodiment, the techniques comprise: obtaining a first image from a first image capture device of an electronic device, wherein the first image comprises pixels and has a first set of dimensions, and wherein the first image is captured using a first aperture setting of the first image capture device; determining a mask region for the first image, wherein the mask region comprises a region of the first image for which a plurality of output pixel values are to be determined, at least in part, by a first neural network; obtaining a first synthetic shallow depth of field (SDOF) image, wherein the first synthetic SDOF image comprises a modified version of the first image, configured to simulate the first image being captured at a second aperture setting by the first image capture device; combining the first synthetic SDOF image with the mask region to generate a first masked synthetic SDOF image; obtaining the first neural network, wherein the first neural network is configured to take the first image, the mask region, and the first masked synthetic SDOF image as input, and use the first neural network to determine the plurality of output pixel values for the mask region, wherein the plurality of output pixel values for the mask region are determined based, at least in part, to simulate image pixels captured at the second aperture setting; and, finally, generating an output image based, at least in part, on a combination of the first masked synthetic SDOF image and the plurality of determined output pixel values for the mask region.

According to some embodiments, the first neural network may be further configured to take a segmentation mask (e.g., a segmentation mask having a second set of dimensions different than the first set of dimensions for the first image) for the first image as input. For example, the segmentation mask may comprise a foreground segmentation mask, background segmentation mask, and/or traditional alpha matte, wherein the region of the first image comprising the mask region is further determined based, at least in part, on corresponding values in the segmentation mask. In some embodiments, a size of the mask region may also be determined based, at least in part, on the second aperture setting.

According to other embodiments, the first neural network may be further configured to extract information regarding the second aperture setting (i.e., the aperture setting being simulated by the first neural network) by comparing corresponding pixels in the first image and the first masked synthetic SDOF image. In particular, the first neural network may be further configured to determine the plurality of output pixel values for the mask region further based, at least in part, on corresponding pixel values in the first image or the first masked synthetic SDOF image.

According to still other embodiments, the process of determining the mask region may further comprise: estimating a foreground region and a background region for the first image; computing gradient magnitudes for pixels in the first image to locate a first plurality of edges; and then identifying pixels from the first image that are (a) not a part of the estimated foreground region, (b) not a part of the estimated background region, and that (c) have a gradient magnitude greater than a threshold value as comprising a pixel of the mask region. If desired, according to some embodiments, a dilation operation may be performed on the identified pixels of the mask region (e.g., based on the magnitude of the second aperture setting being simulated by the first neural network); and the value of the identified pixels of the mask region may be set to a value of zero.

According to still other embodiments, the first synthetic SDOF image may be combined with the mask region to generate a first masked synthetic SDOF image by performing a pixel-wise multiplication operation between the first synthetic SDOF image and the mask region.

According to yet other embodiments, the output image may be generated, at least in part, by replacing the pixels in the first masked synthetic SDOF image corresponding to the mask region with the values of the corresponding output pixel values for the mask region determined by the first neural network.

Various non-transitory program storage device embodiments are disclosed herein. Such program storage devices are readable by one or more processors. Instructions may be stored on the program storage devices for causing the one or more processors to perform any of the techniques disclosed herein.

Various programmable electronic devices are also disclosed herein, in accordance with the program storage device embodiments enumerated above. Such electronic devices may include one or more image capture devices, such as optical image sensors/camera units; a display; a user interface; one or more processors; and a memory coupled to the one or more processors. Instructions may be stored in the memory, the instructions causing the one or more processors to execute instructions in accordance with the various techniques disclosed herein.

DETAILED DESCRIPTION

In the following description, for purposes of explanation, numerous specific details are set forth in order to provide a thorough understanding of the inventions disclosed herein. It will be apparent, however, to one skilled in the art that the inventions may be practiced without these specific details. In other instances, structure and devices are shown in block diagram form in order to avoid obscuring the inventions. References to numbers without subscripts or suffixes are understood to reference all instance of subscripts and suffixes corresponding to the referenced number. Moreover, the language used in this disclosure has been principally selected for readability and instructional purposes and may not have been selected to delineate or circumscribe the inventive subject matter, and, thus, resort to the claims may be necessary to determine such inventive subject matter. Reference in the specification to "one embodiment" or to "an embodiment" (or similar) means that a particular feature, structure, or characteristic described in connection with the embodiments is included in at least one embodiment of one of the inventions, and multiple references to "one embodiment" or "an embodiment" should not be understood as necessarily all referring to the same embodiment.

Introduction and Shallow Depth of Field (SDOF) Background

Figure 1A:
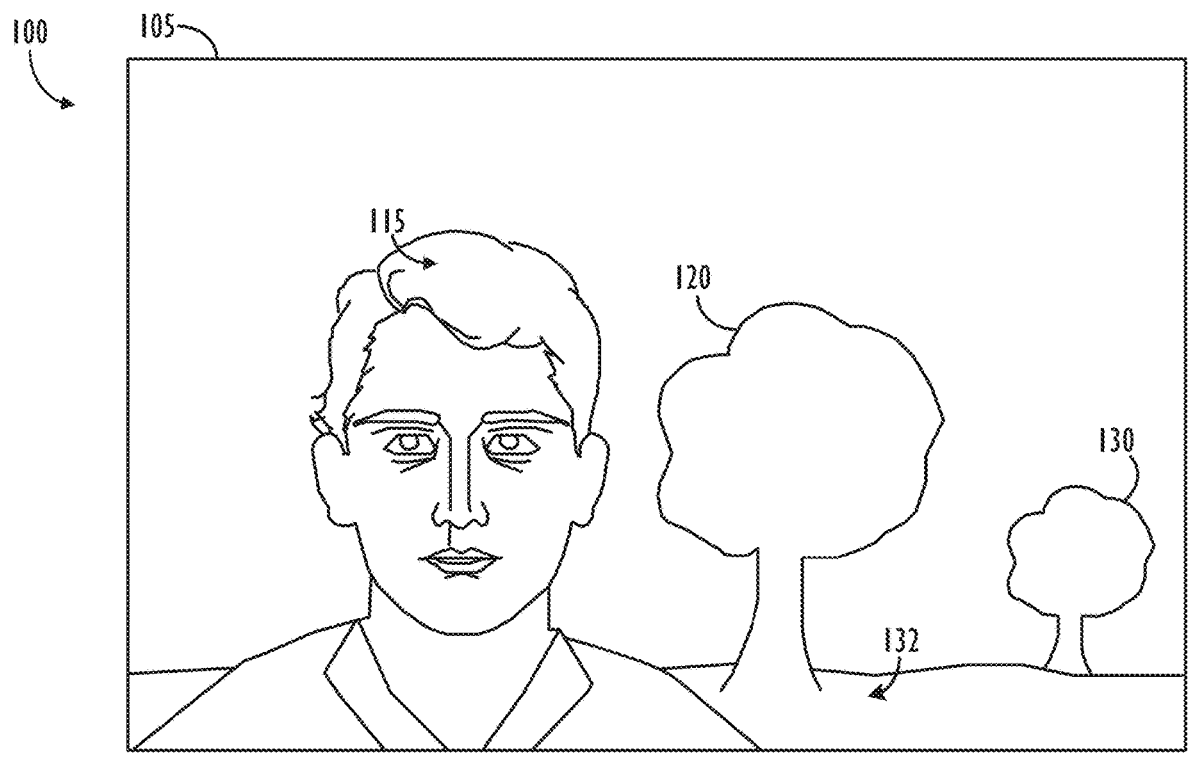
FIGS. 1A and 1B illustrate an exemplary reference image and an exemplary synthetic Shallow Depth of Field (SDOF) version of the exemplary reference image, respectively, according to one or more embodiments.
Figure 1B:
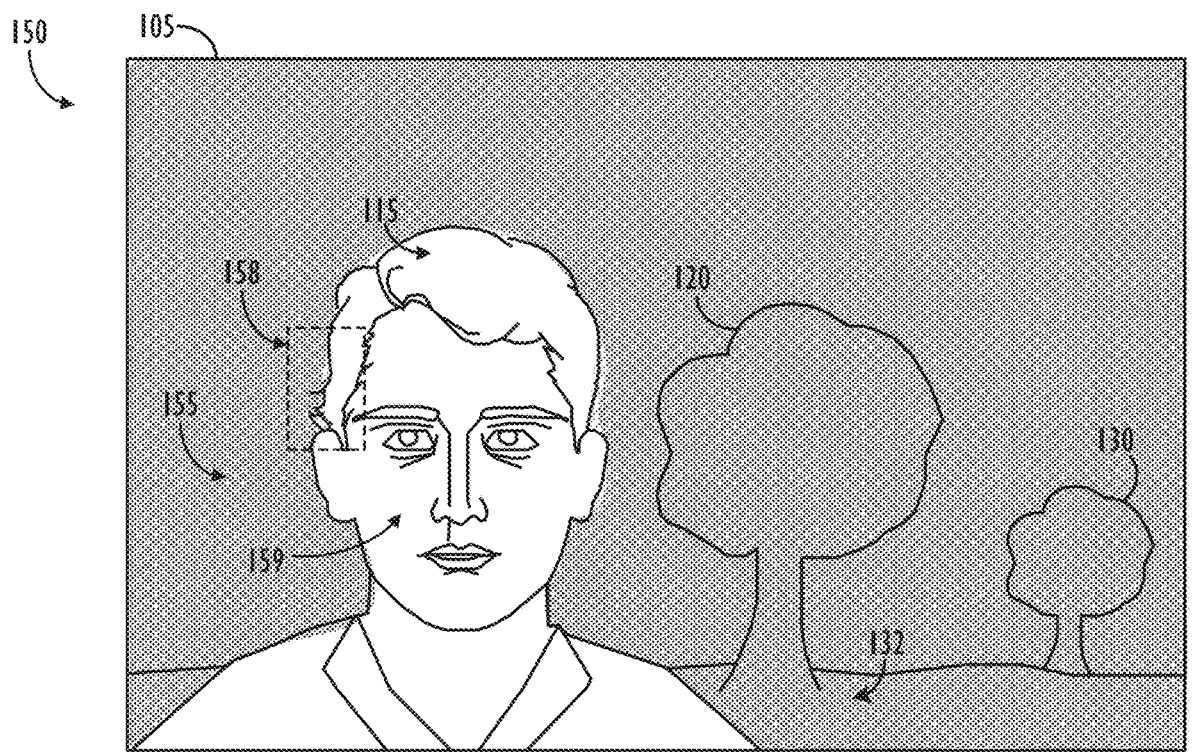

Turning now to FIGS. 1A and 1B, an exemplary reference image 100 and an exemplary synthetic Shallow Depth of Field (SDOF) version 150 of the exemplary reference image 100 are illustrated, respectively, according to one or more embodiments.

FIG. 1A illustrates an exemplary reference image 100 of a captured scene 105 at a first aperture value (e.g., a default aperture value that may be associated with a relatively larger depth of field, e.g., f/8, f/11, f/16, etc., that keeps the entire image relatively sharp from corner-to-corner). The scene 105 comprises human subject 115 in the foreground of scene 105, as well as several elements in the background of scene 105, such as trees 120 and 130, and ground 132. The background of scene 105 in image 100 is shown as being white (i.e., with no shaded gray overlay) to indicate that the background is in largely focus when using the default first aperture value.

FIG. 1B illustrates an exemplary synthetic Shallow Depth of Field (SDOF) version 150 of the exemplary reference image 100 as shown in FIG. 1A. Image 150 in FIG. 1B may be synthesized based on a designated, synthetic aperture value (e.g., a synthetic aperture value that may be associated with a relatively shallower depth of field, e.g., f/1.4, f/2, f/4, etc., that keep the foreground of the image relatively sharp, while applying an amount of blurring and/or synthetic "bokeh" effect to the background portions of the image). Stated another way, image 150 represents the same scene 105 as captured in image 100 shown in FIG. 1A—except that image 150 has been modified, such that it appears that the DOF for image 150 is relatively shallower than the DOF for image 100.

As compared to image 100 in FIG. 1A, FIG. 1B depicts the background in image 150 as largely having a relatively dark gray overlay, indicating a synthetically blurred background region 155 of the image 150. In some embodiments, a smartphone or other multifunction electronic device may execute an image processing pipeline that produces the synthetically blurred background region 155 by blurring the background (or otherwise making the background appear out-of-focus) using a software-based computational image rendering process. FIG. 1B also illustrates that image 150 includes a region of interest 159 that remains in focus (e.g., having no dark gray overlay indicative of synthetic blurring) after applying the synthetic SDOF rendering. As shown in FIG. 1B, the region of interest 159 corresponds to the face of human subject 115, which is in the foreground of scene 105.

Image 150 also includes several transition regions, which re shown with a relatively lighter gray overlay than is used to represent the synthetically blurred background region 155. For example, transition region 158 includes a region of the images where the pixels transition very quickly from being a part of the foreground region of interest 159 to being a part of the background region 155. The relatively lighter gray overlay in parts of transition region 158 indicates that a relatively smaller amount of synthetic blur has been applied to some pixels in the transition region than has been applied to the synthetically blurred background region 155. In one or more implementations, the transition region 158 may include one or more fall-off regions, i.e., regions where the amount of synthetic blurring applied to the image pixels "falls off" gradually as the pixels are located farther and farther form the region of interest 159.

However, the use of transition regions (e.g., as shown at transition region 158), while an attempt to soften the transition from foreground pixels to background pixels, can often result in perceptually unnatural results, since they are not based on the actual physics of the captured scene. For example, hair strands, fabric strands, or other fine-grained details near the borders of an identified foreground region of interest are notoriously difficult to identify and exclude from a software-based synthetic SDOF blurring process, often resulting in unnaturally smoothed/blurred borders around the heads of foreground subjects in synthetic SDOF images, which can make the images easily recognizable as synthetically-produced SDOF images.

Thus, the techniques that will be described herein strive to leverage Machine Learning techniques and Deep Neural Networks to synthesize and replace potentially problematic artifact pixels, predominantly in the transition regions of synthetic SDOF images, with more perceptually-realistic pixels, based on context from nearby reference image pixels, as well as learnings from large training sets of high-resolution, "ground truth" SDOF portrait captures of static scenes at multiple exemplary aperture values.

Exemplary Reference Image and Segmentation Masks

Figure 2:
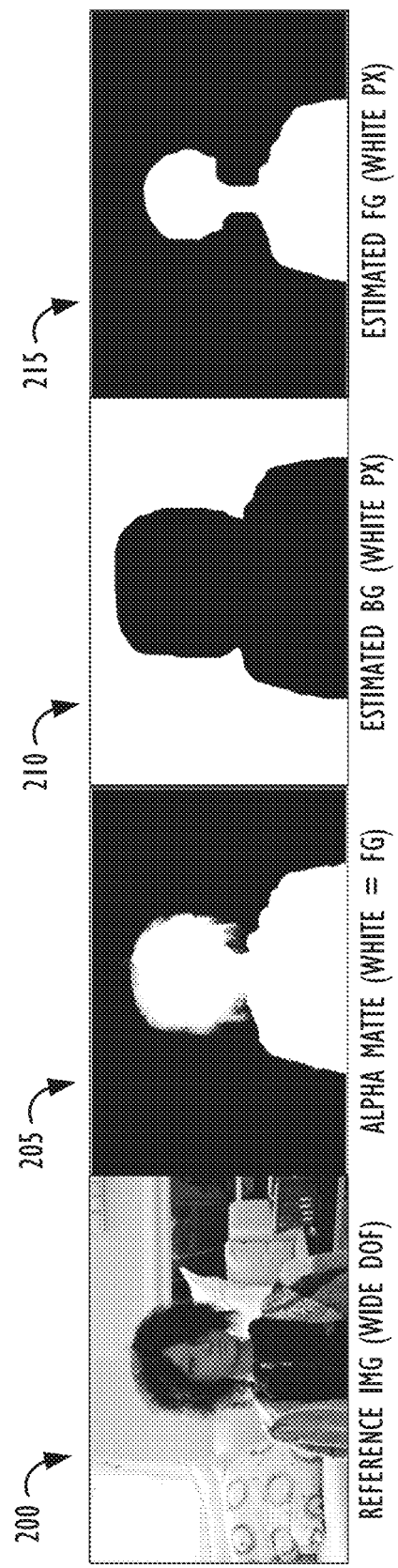
FIG. 2 illustrates an exemplary reference image and a corresponding estimated alpha matte, background segmentation, and foreground segmentation for the exemplary reference image, according to one or more embodiments.

Turning now to FIG. 2, an exemplary reference image 200 and a corresponding estimated alpha matte (205), background segmentation (210), and foreground segmentation (215) for the exemplary reference image 200 are illustrated, according to one or more embodiments. As shown in FIG. 2, reference image 200 represents an image of a scene having a foreground subject that was captured having a wide depth of field (WDOF), e.g., f/8, f/11, f/16, etc.

Alpha matting 205 (or other scene segmentation signals) are commonly available in modern smartphone camera image processing pipelines. For example, the white colored pixels in alpha matte 205 represent assumed foreground pixels, and black pixels represent assumed background pixels. Assuming such a signal is available, it can serve as an optional further guide to the inpainting mask DNN, as will be discussed in further detail below, with reference to FIG. 4. In practice, the resolution of alpha matte 205 does not need to match the resolution of reference image 200, as the DNN may be trained to rely on the coarse/low frequency information present in this alpha matting/segmentation signal.

Estimated background segmentation image 210 may be produced by any desired approach. For example, in the case of image 210, a conservative approach has been taken, beginning with alpha matte 205, and then applying one or more morphological operations as desired to remove uncertain regions near the foreground/background border. In particular, in estimated background segmentation image 210, the white pixels (which are representative of estimated background pixels) exclude any of the areas around the border of the foreground subject in image 200, which may include a mix of true foreground and background pixels, such that a strong assumption can be made that all (or nearly all) of the white pixels remaining in image 210 do indeed represent background pixels and, thus, their blurred values may be taken from a synthetic SDOF image pulled from the camera's existing image processing pipeline—and, thus, do not need to separately determined and inpainted by a DNN, as will be discussed in further detail below, with reference to FIG. 4. As will be understood, if processing resources/time constraints are less (or more) relevant in a given implementation, the implementation may increase (or decrease) the relative amount of pixels whose values it will leave to be determined and inpainted by the DNN.

As with estimated background segmentation image 210, estimated foreground segmentation image 215 may be produced by any desired approach. For example, in the case of image 215, a conservative approach has been taken, beginning with alpha matte 205, and then applying one or more morphological operations as desired to remove uncertain regions near the foreground/background border. In particular, in estimated foreground segmentation image 215, the white pixels (which are representative of estimated foreground pixels) exclude any of the areas around the border of the foreground subject in image 200, which may include a mix of true foreground and background pixels, such that a strong assumption can be made that all (or nearly all) of the white pixels in image 215 do indeed represent foreground pixels and, thus, their blurred values may be taken from the same synthetic SDOF image pulled from the camera's existing image processing pipeline—and, thus, do not need to separately determined and inpainted by a DNN. As will be understood, due to the conservative approach taken in identifying foreground pixels, the pixels taken from the synthetic SDOF image's foreground should actually all correctly be rendered as sharp/unblurred pixels, i.e., unaltered versions of the in-focus pixels, e.g., as captured in reference image 200.

Exemplary Masked Synthetic SDOF Image

Figure 3:
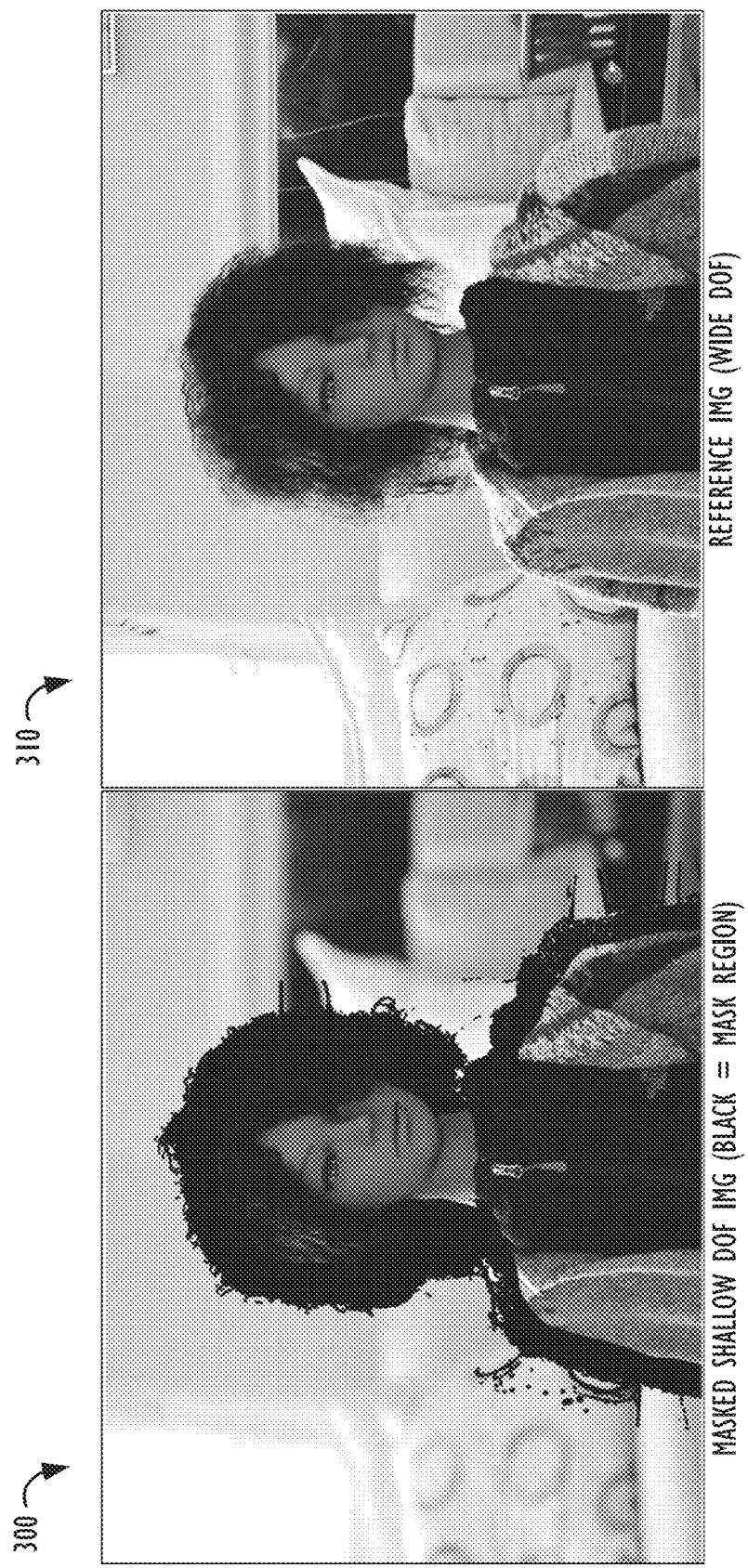
FIG. 3 illustrates an exemplary reference image and a corresponding masked synthetic SDOF image, according to one or more embodiments.

Turning now to FIG. 3, an exemplary reference image 310 and a corresponding masked synthetic SDOF image 300 are illustrated, according to one or more embodiments. Reference image 310 in FIG. 3 is simply a larger version of reference image 200 from FIG. 2, for illustrative and comparative purposes.

According to some embodiments, once image foreground and background segmentation images have been estimated (e.g., such as described above with reference to FIG. 2), gradient magnitudes may be computed for the pixels of reference image 300. Next, the computed gradient magnitudes may be thresholded using an appropriately tuned threshold value to locate edges having significant amounts of contrast in the reference image (i.e., identifying only those pixels having a gradient magnitude that exceeds the threshold value). For example, hair strands, fabric strands, and other fine details are almost always a subset of the high gradient magnitude areas in the reference image. Finally, pixels that are neither a part of the foreground segmentation image nor the background segmentation image—yet still have high gradient magnitudes (i.e., gradient magnitudes exceeding the tuned threshold value) may be selected for inclusion in the mask region of the image that is to be determined and inpainted by the DNN.

If desired, the selected mask region pixels may also be dilated to grow and include any holes within the mask region and/or outlier pixels that may potentially have been misclassified, etc. In some cases, the amount of dilation may be further determined and/or scaled based on the aperture size being simulated in the synthetic SDOC image (e.g., larger apertures may want to leave a larger mask region of pixels to be inpainted by the network). Further, the mask region (e.g., if defined initially as assigning mask pixels values of '1' and non-mask pixels value of '0') may be inverted (e.g., via a "1 minus x" operation, wherein x is a binary pixel value) to produce an inpainting mask where values of '0' in the inpainting mask indicate the invalid/unknown pixels that are to be determined by the DNN, and values of '1' in the inpainting mask indicate valid pixels (i.e., pixels that are not part of the mask region and whose values may simply be pulled from the existing synthetic SDOF image and do not to be separately determined or changed by the DNN).

An example output image of a mask region (i.e., having '1' values for valid pixels and '0' values for invalid pixels that need to be determined by the DNN) being pixel-wise multiplied with the synthetic SDOF image is shown at masked synthetic SDOF image 300 in FIG. 3. As desired, the masked out (i.e., represented as blacked out) pixels in image 300 include all (or nearly all) of the hair strands and other depth boundary image content, for which it is difficult for current synthetic SDOF image processing pipelines to determine perceptually-realistic blurred pixel values. The remaining (i.e., represented as non-blacked out) pixels in image 300 are simply taken from the image processing pipeline's generated synthetic SDOF image (which keeps foreground pixels sharp and applies a desired amount of blurring and/or bokeh effect to definite background pixels). It is these masked out pixels in image 300 whose output pixel value may next be determined by a DNN architecture for intelligent synthetic SDOF image enhancement, such as that which will now be described with reference to FIG. 4.

Exemplary Neural Network Architecture

Deep learning methods have come a long way in producing photorealistic imagery for a variety of tasks, such as super-resolution, deblurring, denoising, and GAN-based image generation. The techniques described herein use an exemplary Deep Neural Network (DNN) architecture and operate as an enhancement stage to significantly increase the perceptual quality of the synthetically rendered SDOF images from current smartphone (and/or other wide DOF camera) portrait image generation processing pipelines.

Figure 4:
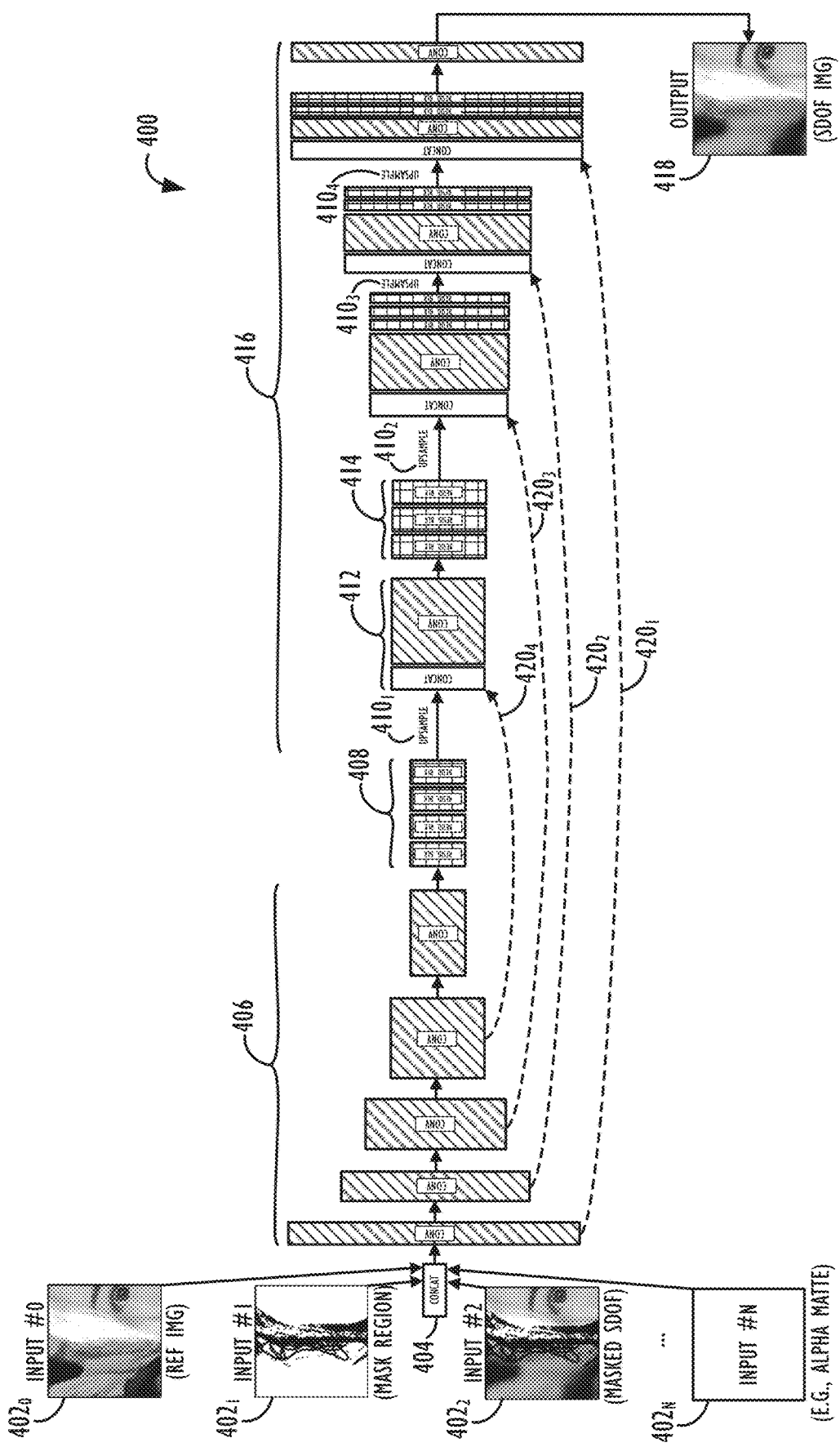
FIG. 4 illustrates an exemplary deep neural network (DNN) architecture for intelligent synthetic SDOF image enhancement, according to one or more embodiments.

Turning now to FIG. 4, an exemplary deep neural network (DNN) architecture for intelligent synthetic SDOF image enhancement 400 is illustrated, according to one or more embodiments. Exemplary neural network architecture 400 provides just one example of the type of deep network architecture that could serve, e.g., as deep neural network in a synthetic SDOF image enhancement pipeline, such as those described herein.

As shown in FIG. 4, a first input, Input #0 to the network 400 may comprise a reference image (a sample portion of which is shown at $402_0$), e.g., an image of the captured scene captured using a default aperture value of the camera device that may be associated with a relatively larger depth of field, e.g., f/8, f/11, f/16, etc., that keeps the entire image relatively sharp from corner-to-corner. (It is to be understood that each of the network inputs described herein may also include downscaled or upscaled versions of the original image and/or be representative of tiled sub-regions form the original image.) A second input, Input #1 to the network 400 may comprise a mask region (a sample portion of which is shown at $402_1$), which, as described above, may comprise a pixel map, with pixels that are deemed to be a part of the mask region having their values set to '0' (or set to any other pre-determined value that is indicative of an invalid pixel whose value in the output image is to be determined by the DNN). A third input, Input #2 to the network 400 may comprise a masked SDOF image (a sample portion of which is shown at $402_2$), which, as described above, may comprise a pixel-wise multiplication of the mask region $402_1$ with a synthetic SDOF image produced by the camera device's existing portrait image pipeline (e.g., a synthetic SDOF image configured to simulate a particular shallower depth of field, e.g., f/1.4, f/2, f/4, etc., that keeps the foreground of the image relatively sharp, while applying an amount of blurring and/or synthetic "bokeh" effect to the background portions of the image).

As mentioned above, having the values of pixels that are deemed to be a part of the mask region set to '0' can be used by the network 400 as an indication of the pixels that the network needs to determine new output pixel values for that will simulate a perceptually-realistic SDOF image. According to some embodiments, the network 400 may be trained and designed to also accept any number, n, of additional inputs, e.g., an alpha matte ($402_N$), which additional inputs may be leveraged as further signals to help the network determine the most appropriate output pixel values for the mask region pixels in order to simulate a perceptually-realistic SDOF look-and-feel in the output image 418.

According to some embodiments, for ease of processing, each of the inputs $402_1$ through $402_N$ to network 400 may be concatenated at block 404 into a single data structure before being fed into the first convolutional layer of the so-called "contracting path" 406 of network 400. In some embodiments, network 400 may comprise a convolutional neural network, e.g., a U-Net or similar design, and directly output the resulting enhanced SDOF output image 418.

As is typical in a U-Net, each layer in the contracting path 406 of the network 400 may operate on smaller and smaller scale representations of the input image data, until reaching the central or 'bottleneck' layer. The contracting path 406 may comprise one or more of convolutional layers (each optionally followed by one or more rectified linear units (ReLUs) and/or pooling operations). In the contracting path, the spatial extent of the image information may be reduced (e.g., by a factor of 2) with each successive layer, while the feature information depth is increased. In some embodiments, the contracting path may be followed by one or more residual blocks 408, e.g., performing one or more dilation convolution operations on the image representations to provide a large receptive field.

In the so-called "expanding path" 416, beginning after the bottleneck layer, the network 400 may begin to combine the feature and spatial information through a sequence of up-convolutions and concatenations 412 with high-resolution features from the contracting path (e.g., as passed through the network via skip connections 420N). In the expanding path, the spatial extent of the image information may be increased using upsampling operations 410 (e.g., by a factor of 2) with each successive layer, while the feature information depth is decreased. The expanding path may also employ one or more residual block layers 414 at each level, e.g., to allow for more complexity in the network, learn an appropriate function, and achieve more perceptually-realistic results.

Finally, at the end of the network, one or more layers, e.g., a convolution layer, may be applied (e.g., with no ReLU) that takes the image data at the proper output resolution back down to the desired number of channels, e.g., 3 channels (such as RGB or YUV) to generate the resulting enhanced SDOF output image 418, with the values of the pixels in the masked region inpainted by the network. As may now be understood, by leveraging contextual color and detail information, as well as blurring information, in nearby valid pixels, the network may learn how to recreate appropriate amounts of blurring in the mask region pixels.

Training Operations and Exemplary Loss Functions

At training time, hundreds (or thousands) of sets of "ground truth" DSLR images of static scenes, captured at varying aperture settings, may be analyzed by the network. Preferably, such static scenes will cover many examples of human subjects (or other objects of interest) with different amounts of scene foreground/background separation, lighting conditions, and various kinds and amounts of hair, fabric, or other fine-grained details occurring near the foreground/background transition of the images.

As described above, the reference image for each set of training images may be a wide DOF capture from a DSLR camera, keeping almost all image detail in focus (e.g., using an aperture setting such as f/8, f/11, f/16, etc.). The other images in each set of training images may comprise one or more additional images captured by the DSLR camera using a shallower DOF (e.g., using aperture settings such as f/1.4, f/2, f/4, etc.) and focused on the subject of interest in the scene. Because the captured scenes in the training set are ideally static in between captures, the network may use the various SDOF captures within each set of training images to learn the incremental amount of increased blurring experienced in background pixels at each successively larger aperture setting. During the training operation, the network may also learn visually pleasing (i.e., not necessarily physically correct based on the scene) ways to implement sharpness fall-off in the rendered SDOF image (i.e., how to transition pixels form sharp to blurry, while moving from pixels making up the foreground subject's face or other body parts outwards toward background pixels) and, in particular, in hair details appearing against backgrounds of various complexities and depths. (Note: If there is too much movement of the objects in the scene between the successive capture of the images in a given training image set, then there may not be a strong correspondence between co-located pixels across the images in the training set, making it more difficult for the network to learn meaningful new information from that particular set of training images. However, some minimal amounts of local misalignment, e.g., due to scene motion between successive captures, can be interpreted by the network as "noise" in the training data, and thus actually help in the training process to make the network more robust.) According to some embodiments, the sets of training images may also be downsampled and/or rotated to augment the training image data in a meaningful way—without having to capture additional new training images.

Ideally, the training data used to train network 400 also provides a diverse range of defocus blur strengths in the background for the reference image. For example, if a reference image shows a 4-pixel lens defocus in the background next to the depth boundary of the foreground subject, reducing the spatial resolution by half in each dimension will shrink the defocus blur to 2 pixels, thereby providing efficient data augmentation. It has been determined that defocus blur can be a useful cue to the network 400, since the reference image as captured by both a typical smartphone WDOF camera and a true DSLR camera readily exhibit natural defocus blur, e.g., due to lens design and the fact that most smartphone cameras have large apertures.

As may now be understood, the reference image within each training set may be used by the network to learn how much each pixel was (or wasn't) blurred at each successively shallower DOF image in the captured training set and, because the training images are captured with an actual DSLR (or other true SDOF-capable camera/lens combination), the fine details, such as hair or fabric, remain perfectly in focus (assuming the foreground subject is in focus in the reference image) in the captured SDOF versions of the training reference images, since the actual physics of the scene and photons are being used by the capturing camera to create the SDOF training images (as opposed to the computational image processing used by current smartphones with WDOF cameras to generate synthetic SDOF images).

As described above with reference to FIG. 3, a mask region to be inpainted by the network 400 may be computed based on the reference image and, optionally, an alpha matte or other segmentation mask, e.g., if one is available for the captured reference image. The masked SDOF image (e.g., image 300 in FIG. 3) may be computed as the pixel-wise or element-wise product of the inpainting mask and the SDOF image. Hence, the network 400's job at training time is to inpaint the zeroed out pixels in the masked SDOF image to recover the full SDOF image as closely as possible to the ground truth SDOF image captured by the DSLR camera (such as the aforementioned f/1.4, f/2, f/4, etc. captures of the same scene as the reference image).

If desired, a different ML model may be trained for two or more of a given multi-camera device's different cameras. For example, a modern smartphone may have front-facing and back-facing cameras with widely varying optical properties, and thus, it may be beneficial to train ML models using ground truth images captured by cameras as similar as possible to each of the particular smartphone's cameras that it is desired to have a separate trained ML model for. Then, at inference time, the ML model for the appropriate capturing camera may be obtained and used to perform the aforementioned mask inpainting operations to produce the enhanced synthetic SDOF images.

The input images to the network may also be downscaled as desired and/or broken into individual tiles of pixels, e.g., 200×200 pixel tiles or 400×400 pixel tiles, etc., that make up sub-regions within the mask region that contain 'invalid' pixels, i.e., pixels whose values are to be determined by the DNN. In some embodiments, the tiles may be roughly centered around the pixels along hair or subject boundaries, according to the mask region. In order to improve training performance, in some embodiments, batches of images or image tiles, e.g., 8 or 12 or 16 images or images tiles, may be processed at a time. According to some embodiments, during the training process, the learning rate of the network may be reduced after a certain number of epochs, e.g., a learning rate may be reduced by 0.5 every 10 epochs, assuming there will be a total of 50 training epochs.

According to other embodiments, various loss functions may be used during the training process. For example, the loss term may include a weighted sum of one or more loss terms, e.g., a VGG-19-based perceptual loss term, a pixel-wise Huber reconstruction loss term, and/or a GAN-based adversarial loss term. As may be appreciated, any one or more of these loss functions may be used or combined in various ways during a given training operation, based on the needs of a given implementation. The loss functions described herein are merely exemplary of the types of loss functions that may be used to attempt to train the deep network 400 in an effective and efficient fashion. Moreover, each loss term may be active all throughout training—or may be activated only after certain training epochs. The training operation may conclude when the loss function (or combination of loss functions) reaches a satisfactory minimum value and/or when it appears that further iterations of training will not produce noticeably better output image results.

Exemplary Image Processing Operations

Figure 5A:
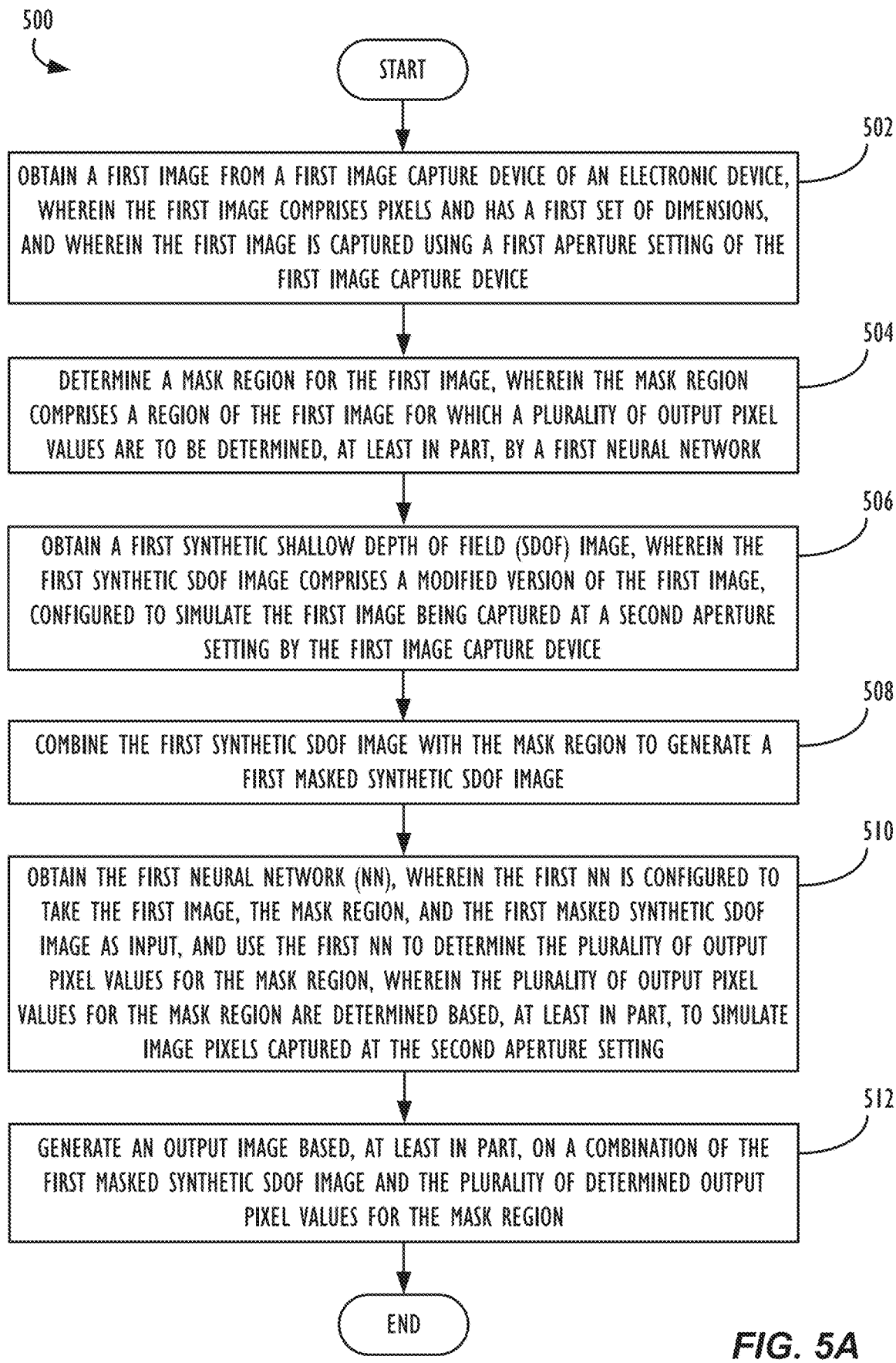
FIG. 5A is flow chart illustrating a method of performing neural network-enhanced SDOF image processing techniques, according to one or more embodiments.

Referring now to FIG. 5A, a flow chart illustrating a method 500 of a method of performing neural network-enhanced synthetic SDOF image processing techniques is shown, in accordance with one or more embodiments. First, at Step 502, the method 500 may obtain a first image from a first image capture device of an electronic device, wherein the first image comprises pixels and has a first set of dimensions, and wherein the first image is captured using a first aperture setting of the first image capture device. For example, the first aperture setting for the first image (also referred to herein as a "reference image" at times), may represent a "wide" DOF setting, such as f/12 or f/16. Using such a setting for the first aperture setting may result in a first image where all (or nearly all) of the pixels in the captured first image are relatively sharp and "in focus." As described above, this first image or "reference image" can provide a good "ground truth" of the fine details in the captured scenes, especially those fine details that may be located at or near the transition from the scene background to the scene foreground, which can be difficult for traditional synthetic SDOF rendering algorithms to handle in a natural-looking way (i.e., with a look that simulates a capture by a true DSLR or other shallow DOF camera lens).

Next, at Step 504, the method 500 may determine a mask region for the first image, wherein the mask region comprises a region of the first image for which a plurality of output pixel values are to be determined, at least in part, by a first neural network. As mentioned above, according to some embodiments, the mask region may comprise pixels representing fine details (e.g., as measured by pixel gradient magnitude) that may be located at or near the transition from the scene background to the scene foreground and/or not clearly belonging to either the scene background or scene foreground, e.g., based on an obtained alpha matte for the reference image. It is to be understood that the intelligent portrait photography enhancement techniques described herein may also be enabled or disabled based on one more gating signals, e.g., related to the composition of the scene being captured. For example, if there is not sufficient foreground/background separation in the image, if there are too many (or not enough) human faces detected of a sufficient quality level and size, if the overall noise level or sharpness level of the image is not greater than a minimum threshold, etc., then the intelligent portrait photography enhancement techniques described herein may be disabled, as desired.

Next, at Step 506, the method 500 may obtain a first synthetic SDOF image, wherein the first synthetic SDOF image comprises a modified version of the first image, configured to simulate the first image being captured at a second aperture setting by the first image capture device. As described above, the first synthetic SDOF image may, e.g., be generated by a WDOF camera device's existing computational-based portrait image processing pipeline. At Step 508, the method 500 may combine the first synthetic SDOF image with the mask region to generate a first masked synthetic SDOF image.

Next, at Step 510, the method 500 may obtain the first neural network (NN), wherein the first NN is configured to take the first image, the mask region, and the first masked synthetic SDOF image as input, and use the first NN to determine the plurality of output pixel values for the mask region, wherein the plurality of output pixel values for the mask region are determined based, at least in part, to simulate image pixels captured at the second aperture setting.

Finally, at Step 512, the method 500 may conclude by generating an output image based, at least in part, on a combination of the first masked synthetic SDOF image and the plurality of determined output pixel values for the mask region.

Figure 5B:
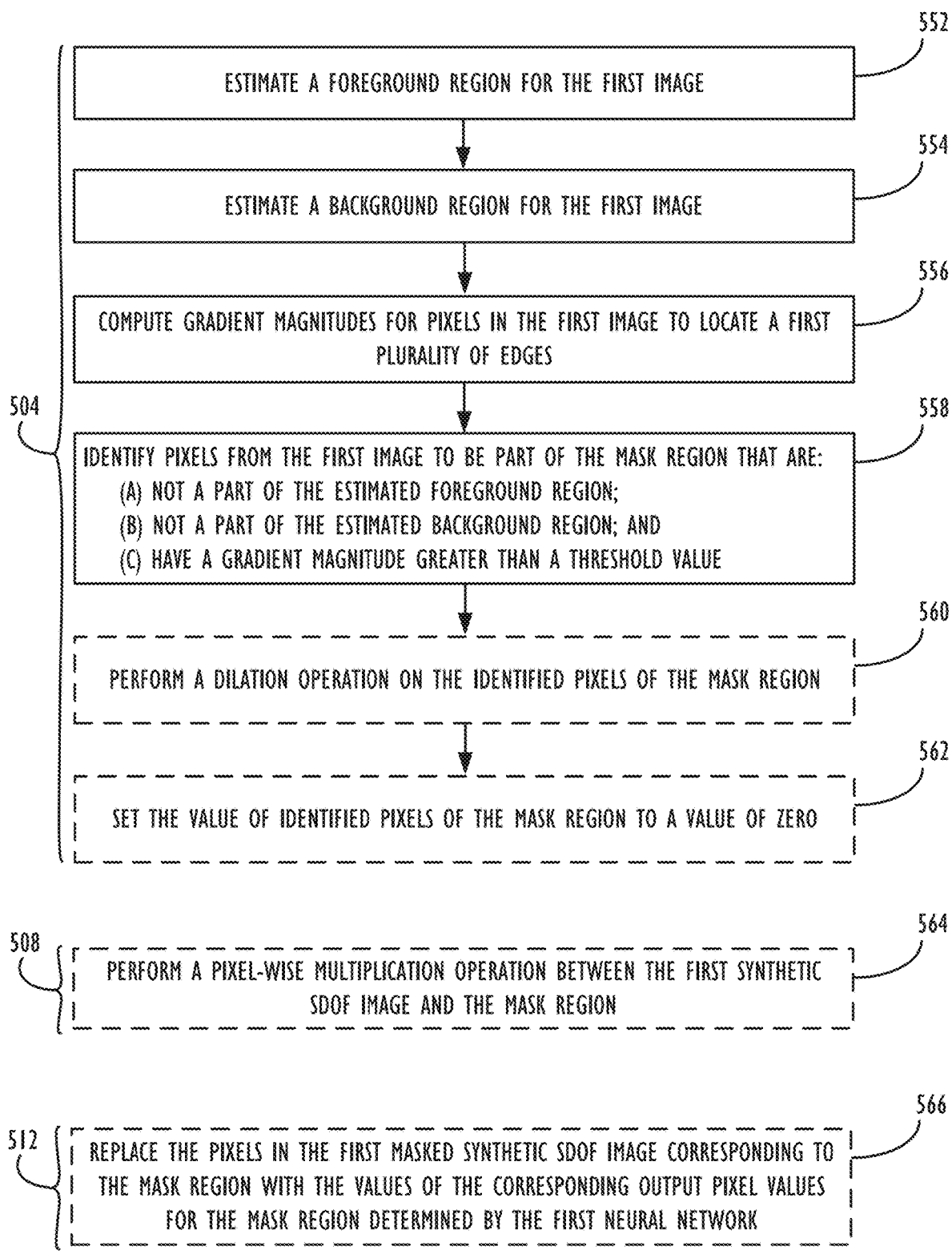
FIG. 5B is flow chart illustrating additional details regarding a method of performing neural network-enhanced SDOF image processing techniques, according to one or more embodiments.

Referring now to FIG. 5B, a flow chart illustrating a more detailed method of performing Steps 504, 508, and 512 of FIG. 5A (i.e., determining the mask region within the first or "reference" image) is shown, in accordance with one or more embodiments. First, at Step 552, the method Step 504 may further comprise estimating a foreground region for the first image. At Step 554, the method Step 504 may further comprise estimating a background region for the first image. It is to be understood that any desired techniques (e.g., segmentation masks, alpha matting, phase detection pixels, split photodiodes, etc.) may be utilized to inform the initial estimates of the image's foreground and background, and that such estimates may be tuned (e.g., made more or less aggressive in "claiming" pixels for a particular region), based on the needs of a given implementation. It is also to be understood that, one or more pixels in the first image may also maintain an "unknown" status after the completion of Steps 552 and 554, i.e., such pixels are not characterized as being reliably either foreground or background pixels.

At Step 556, the method Step 504 may further comprise computing gradient magnitudes for pixels in the first image to locate a first plurality of edges. For example, pixels with greater than or equal to a threshold gradient magnitude may be classified as edge pixels for the purposes of Step 556, and pixels with less than the threshold gradient magnitude may be classified as non-edge pixels. According to some embodiments, pixels that do not represent a sufficiently strong edge in the original first "reference" image may be deemed unlikely to be foreground details, and thus their values in the output image may simply be pulled from the first masked synthetic SDOF image, thus reducing the amount of processing and pixel output value determination that needs to be performed by the first NN.

At Step 558, the method Step 504 may further comprise identifying the pixels from the first image to be part of the mask region as pixel that are: (a) not a part of the estimated foreground region (e.g., as estimated at Step 552); (b) not a part of the estimated background region (e.g., as estimated at Step 554); and (c) have a gradient magnitude greater than a threshold value (e.g., as estimated at Step 556). Once a mask region has been identified in the first image, if desired, a dilation operation may be performed on the identified pixels of the mask region at Step 560, in order to, e.g., grow the mask region to include "holes," make nearly-contiguous mask regions fully-contiguous, and/or simply to increase the size of the originally-identified mask region, so as to make a more conservative estimate of the number of pixels whose output pixel values are to be determined by the first NN (i.e., causing the first NN to determine output pixel values for a larger number of pixels in the first image). In some cases, the amount of dilation applied to the mask region may be based on the magnitude of the second aperture setting being simulated by the first NN.

At Step 562, if desired, the identified pixels of the mask region may have their values set to zero. This may be helpful, e.g., in embodiments where the first NN has been trained to determine new output pixel values for any pixels in the mask region (or, by extension, the first masked synthetic SDOF image) having a pixel value of zero. Pixels having a non-zero value may thus be ignored by the first NN (i.e., instead using the corresponding pixel values form the first masked synthetic SDOF image as the pixel's value in the generated output image) to conserve further processing resources and minimize the overall number of pixels that the first NN is relied upon to create output pixel values for.

At Step 564, additional details regarding Step 508 of method 500 are provided. In particular, in some embodiments, the combination of the first synthetic SDOF image with the mask region to generate a first masked synthetic SDOF image may further comprise performing a pixel-wise multiplication operation between the first synthetic SDOF image and the mask region. As discussed above, assuming that the value of the identified pixels of the mask region are set to zero and all other pixels have a value of one, then multiplication with the first synthetic SDOF image will replace mask region pixels with zeroed out pixels (i.e., via a multiplication by a value of zero), while all other pixels in the first synthetic SDOF image will remain unaltered (i.e., via a multiplication by a value of one). As explained above, to conserve processing resources, some embodiments may try to minimize the number of pixels that the first NN is used to determine output pixel values for during the enhancement operation, i.e., only those pixels that the mask region indicates are invalid for usage in the output image.

At Step 566, additional details regarding Step 512 of method 500 are provided. In particular, in some embodiments, the combination of the first masked synthetic SDOF image and the plurality of determined output pixel values for the mask region may comprise replacing the pixels in the first masked synthetic SDOF image corresponding to the mask region with the values of the corresponding output pixel values for the mask region determined by the first neural network.

In other embodiments, the combination of the first masked synthetic SDOF image and the plurality of determined output pixel values for the mask region could also comprise a blending operation, e.g., between the values of the determined output pixel values for the mask region and one or more of the corresponding pixels in the first (i.e., reference) image or the corresponding pixel in the first synthetic SDOF image. This blending technique may be beneficial, e.g., in portions of the mask region wherein there is lower confidence that a given pixel actually belongs in the mask region. For example, in such portions, the final value of the output pixel value may be determined, in a larger part, by the value of the corresponding pixel in the first synthetic SDOF image (i.e., rather than the value determine by the first neural network).

As may now be appreciated, the techniques of method 500 may provide various benefits for synthetic SDOF image enhancement, in particular, the ability to enhance image details in border regions between image foreground and image background (especially in pixels associated with a hair strand or fabric strand or other fine details present in the foreground of the first image) to bridge the image quality gap between images captured by wide DOF cameras (such as those found in most modern smart phones) and DSLR or true shallow DOF cameras. In particular, to perform this image enhancement task, the DNN may learn to transfer appropriate details from the reference image to the output SDOF image, when needed. According to some such embodiments, the DNN may determine output pixel values (i.e., for the pixels in the first masked synthetic SDOF image corresponding to the pixels from the mask region designated as being "invalid") by transferring back in content from the reference image with various amount of blurring added. The amount of added blur may be determined by the DNN using contextual information, such as the amount of blur present in surrounding pixels in the first synthetic SDOF image, as well as the semantics of the image content. For example, hair pixels are usually transferred from the reference image with some slight blurring to simulate sharpness fall-off in pixels moving away from the subject's face, while background pixels are typically more heavily blurred by the DNN to mimic the amount of blur in the surrounding pixels of the existing first synthetic SDOF image. Through this process, some color shifting might occur, but it is usually occurring within a blurred version of the details from the reference image, so there is not typically any appreciable degradation in the perceptual quality of the rendered SDOF image.

Exemplary Electronic Computing Devices

Figure 6:
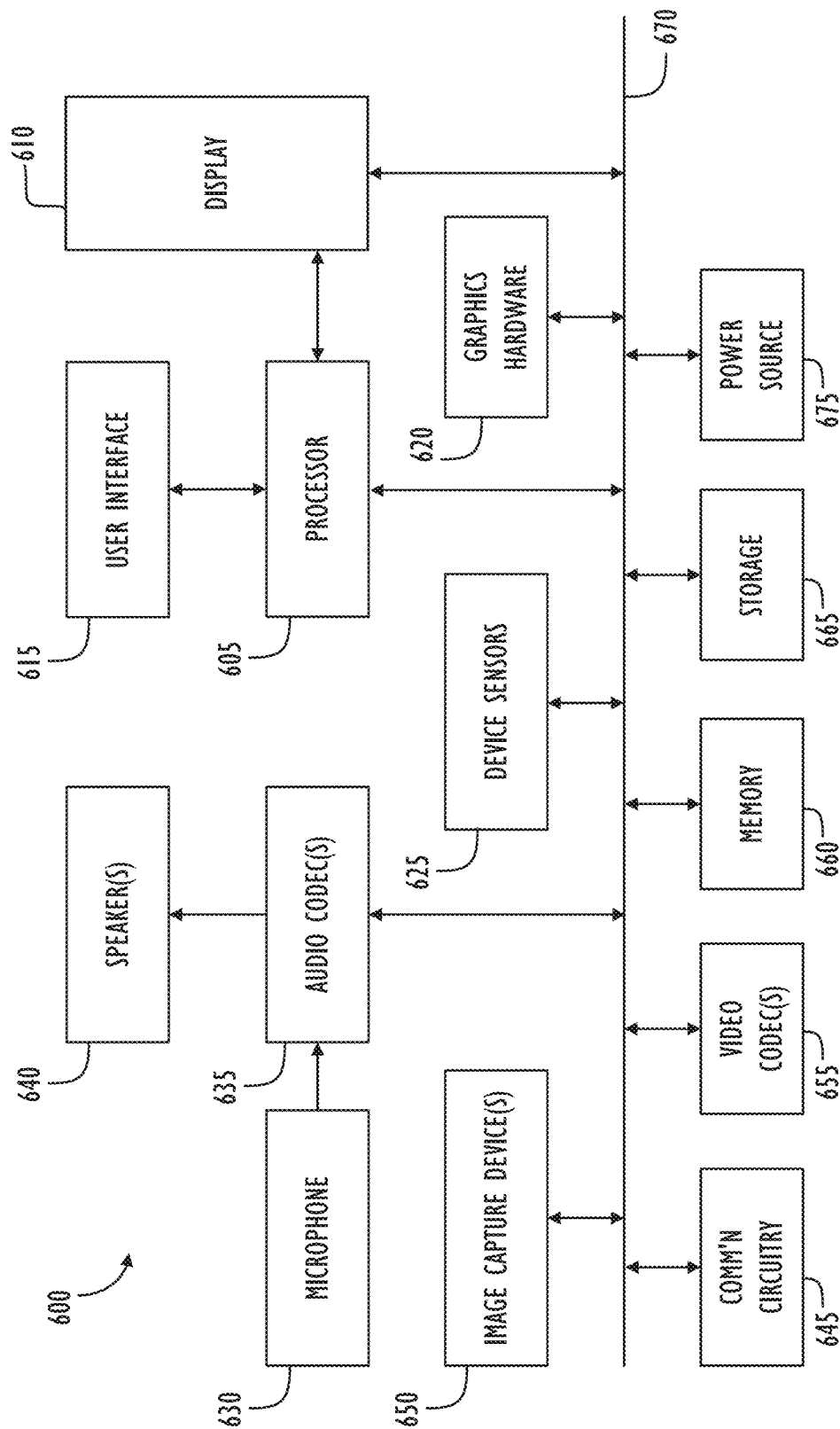
FIG. 6 is a block diagram illustrating a programmable electronic computing device, in which one or more of the techniques disclosed herein may be implemented.

Referring now to FIG. 6, a simplified functional block diagram of illustrative programmable electronic computing device 600 is shown according to one embodiment. Electronic device 600 could be, for example, a mobile telephone, personal media device, portable camera, or a tablet, notebook or desktop computer system. As shown, electronic device 600 may include processor 605, display 610, user interface 615, graphics hardware 620, device sensors 625 (e.g., proximity sensor/ambient light sensor, accelerometer, inertial measurement unit, and/or gyroscope), microphone 630, audio codec(s) 635, speaker(s) 640, communications circuitry 645, image capture device 650, which may, e.g., comprise multiple camera units/optical image sensors having different characteristics or abilities (e.g., Still Image Stabilization (SIS), high dynamic range (HDR), optical image stabilization (OIS) systems, optical zoom, digital zoom, etc.), video codec(s) 655, memory 660, storage 665, and communications bus 670.

Processor 605 may execute instructions necessary to carry out or control the operation of many functions performed by electronic device 600 (e.g., such as the generation and/or processing of images in accordance with the various embodiments described herein). Processor 605 may, for instance, drive display 610 and receive user input from user interface 615. User interface 615 can take a variety of forms, such as a button, keypad, dial, a click wheel, keyboard, display screen and/or a touch screen. User interface 615 could, for example, be the conduit through which a user may view a captured video stream and/or indicate particular image frame(s) that the user would like to capture (e.g., by clicking on a physical or virtual button at the moment the desired image frame is being displayed on the device's display screen). In one embodiment, display 610 may display a video stream as it is captured while processor 605 and/or graphics hardware 620 and/or image capture circuitry contemporaneously generate and store the video stream in memory 660 and/or storage 665. Processor 605 may be a system-on-chip (SOC) such as those found in mobile devices and include one or more dedicated graphics processing units (GPUs). Processor 605 may be based on reduced instruction-set computer (RISC) or complex instruction-set computer (CISC) architectures or any other suitable architecture and may include one or more processing cores. Graphics hardware 620 may be special purpose computational hardware for processing graphics and/or assisting processor 605 perform computational tasks. In one embodiment, graphics hardware 620 may include one or more programmable graphics processing units (GPUs) and/or one or more specialized SOCs, e.g., an SOC specially designed to implement neural network and machine learning operations (e.g., convolutions) in a more energy-efficient manner than either the main device central processing unit (CPU) or a typical GPU, such as Apple's Neural Engine processing cores.

Image capture device 650 may comprise one or more camera units configured to capture images, e.g., images which may be processed to generate enhanced versions of said captured images, e.g., in accordance with this disclosure. Output from image capture device 650 may be processed, at least in part, by video codec(s) 655 and/or processor 605 and/or graphics hardware 620, and/or a dedicated image processing unit or image signal processor incorporated within image capture device 650. Images so captured may be stored in memory 660 and/or storage 665. Memory 660 may include one or more different types of media used by processor 605, graphics hardware 620, and image capture device 650 to perform device functions. For example, memory 660 may include memory cache, read-only memory (ROM), and/or random access memory (RAM). Storage 665 may store media (e.g., audio, image and video files), computer program instructions or software, preference information, device profile information, and any other suitable data. Storage 665 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 660 and storage 665 may be used to retain computer program instructions or code organized into one or more modules and written in any desired computer programming language. When executed by, for example, processor 605, such computer program code may implement one or more of the methods or processes described herein. Power source 675 may comprise a rechargeable battery (e.g., a lithium-ion battery, or the like) or other electrical connection to a power supply, e.g., to a mains power source, that is used to manage and/or provide electrical power to the electronic components and associated circuitry of electronic device 600.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled.

What is claimed is:

1. A non-transitory computer readable medium comprising computer readable instructions executable by one or more processors to:
   obtain a first image from a first image capture device of an electronic device, wherein the first image comprises pixels and has a first set of dimensions, and wherein the first image is captured using a first aperture setting of the first image capture device;
   determine a mask region for the first image, wherein the mask region comprises a region of the first image for which a plurality of output pixel values are to be determined, at least in part, by a first neural network;
   obtain a first synthetic shallow depth of field (SDOF) image, wherein the first synthetic SDOF image comprises a modified version of the first image, configured to simulate the first image being captured at a second aperture setting by the first image capture device;
   combine the first synthetic SDOF image with the mask region to generate a first masked synthetic SDOF image;
   obtain the first neural network, wherein the first neural network is configured to take the first image, the mask region, and the first masked synthetic SDOF image as input, and use the first neural network to determine the plurality of output pixel values for the mask region, wherein the plurality of output pixel values for the mask region are determined based, at least in part, to simulate image pixels captured at the second aperture setting; and
   generate an output image based, at least in part, on a combination of the first masked synthetic SDOF image and the plurality of determined output pixel values for the mask region.

2. The non-transitory computer readable medium of claim 1, wherein the first neural network is further configured to take a segmentation mask for the first image as input.

3. The non-transitory computer readable medium of claim 2, wherein the segmentation mask has a second set of dimensions different than the first set of dimensions for the first image.

4. The non-transitory computer readable medium of claim 2, wherein the segmentation mask comprises a foreground segmentation mask or background segmentation mask, and wherein the region of the first image comprising the mask region is further determined based, at least in part, on corresponding values in the segmentation mask.

5. The non-transitory computer readable medium of claim 1, wherein the first neural network is further configured to extract information regarding the second aperture setting by comparing corresponding pixels in the first image and the first masked synthetic SDOF image.

6. The non-transitory computer readable medium of claim 5, wherein the first neural network is further configured to determine the plurality of output pixel values for the mask region further based, at least in part, on corresponding pixel values in the first image or the first masked synthetic SDOF image.

7. The non-transitory computer readable medium of claim 1, wherein a size of the mask region is determined based, at least in part, on the second aperture setting.

8. The non-transitory computer readable medium of claim 1, wherein the instructions executable by one or more processors to determine a mask region further comprise instructions to:
   estimate a foreground region and a background region for the first image;
   compute gradient magnitudes for pixels in the first image to locate a first plurality of edges; and
   identify pixels from the first image that are not a part of the estimated foreground region, not a part of the estimated background region, and have a gradient magnitude greater than a threshold value as comprising a pixel of the mask region.

9. The non-transitory computer readable medium of claim 8, wherein the instructions executable by one or more processors to determine a mask region further comprise instructions to:
   perform a dilation operation on the identified pixels of the mask region; and
   set the value of identified pixels of the mask region to a value of zero.

10. The non-transitory computer readable medium of claim 9, wherein the instructions executable by one or more processors to combine the first synthetic SDOF image with the mask region to generate a first masked synthetic SDOF image further comprise instructions to:

perform a pixel-wise multiplication operation between the first synthetic SDOF image and the mask region.

11. The non-transitory computer readable medium of claim 10, wherein the instructions executable by one or more processors to generate an output image based, at least in part, on a combination of the first masked synthetic SDOF image and the plurality of determined output pixel values for the mask region further comprise instructions to:

replace the pixels in the first masked synthetic SDOF image corresponding to the mask region with the values of the corresponding output pixel values for the mask region determined by the first neural network.

12. The non-transitory computer readable medium of claim 1, wherein the mask region comprises at least one pixel associated with a hair strand or fabric strand present in the first image.

13. A device, comprising:
a memory;
one or more image capture devices;
a user interface; and
one or more processors operatively coupled to the memory, wherein the one or more processors are configured to execute instructions causing the one or more processors to:
obtain a first image from a first image capture device of the one or more image capture devices, wherein the first image comprises pixels and has a first set of dimensions, and wherein the first image is captured using a first aperture setting of the first image capture device;
determine a mask region for the first image, wherein the mask region comprises a region of the first image for which a plurality of output pixel values are to be determined, at least in part, by a first neural network;
obtain a first synthetic shallow depth of field (SDOF) image, wherein the first synthetic SDOF image comprises a modified version of the first image, configured to simulate the first image being captured at a second aperture setting by the first image capture device;
combine the first synthetic SDOF image with the mask region to generate a first masked synthetic SDOF image;
obtain the first neural network, wherein the first neural network is configured to take the first image, the mask region, and the first masked synthetic SDOF image as input, and determine the plurality of output pixel values for the mask region, wherein the plurality of output pixel values for the mask region are determined based, at least in part, to simulate image pixels captured at the second aperture setting; and
generate an output image based, at least in part, on a combination of the first masked synthetic SDOF image and the plurality of determined output pixel values for the mask region.

14. The device of claim 13, wherein the instructions executable by one or more processors to determine a mask region further comprise instructions to:

estimate a foreground region and a background region for the first image;
compute gradient magnitudes for pixels in the first image to locate a first plurality of edges; and
identify pixels from the first image that are not a part of the estimated foreground region, not a part of the estimated background region, and having a gradient magnitude greater than a threshold value as comprising a pixel of the mask region.

15. The device of claim 14, wherein the instructions executable by one or more processors to determine a mask region further comprise instructions to:

perform a dilation operation on the identified pixels of the mask region; and
set the value of identified pixels of the mask region to a value of zero.

16. The device of claim 15, wherein the instructions executable by one or more processors to combine the first synthetic SDOF image with the mask region to generate a first masked synthetic SDOF image further comprise instructions to:

perform a pixel-wise multiplication operation between the first synthetic SDOF image and the mask region.

17. The device of claim 16, wherein the instructions executable by one or more processors to generate an output image based, at least in part, on a combination of the first masked synthetic SDOF image and the plurality of determined output pixel values for the mask region further comprise instructions to:

replace the pixels in the first masked synthetic SDOF image corresponding to the mask region with the values of the corresponding output pixel values for the mask region determined by the first neural network.

18. An image processing method, comprising:
obtaining a first image from a first image capture device, wherein the first image comprises pixels and has a first set of dimensions, and wherein the first image is captured using a first aperture setting of the first image capture device;
determining a mask region for the first image, wherein the mask region comprises a region of the first image for which a plurality of output pixel values are to be determined, at least in part, by a first neural network;
obtaining a first synthetic shallow depth of field (SDOF) image, wherein the first synthetic SDOF image comprises a modified version of the first image, configured to simulate the first image being captured at a second aperture setting by the first image capture device;
combining the first synthetic SDOF image with the mask region to generate a first masked synthetic SDOF image;
obtaining the first neural network, wherein the first neural network is configured to take the first image, the mask region, and the first masked synthetic SDOF image as input, and determine the plurality of output pixel values for the mask region, wherein the plurality of output pixel values for the mask region are determined based, at least in part, to simulate image pixels captured at the second aperture setting; and
generating an output image based, at least in part, on a combination of the first masked synthetic SDOF image and the plurality of determined output pixel values for the mask region.

19. The method of claim 18, wherein the first neural network is further configured to extract information regarding the second aperture setting by comparing corresponding pixels in the first image and the first masked synthetic SDOF image.

20. The method of claim 19, wherein the first neural network is further configured to determine the plurality of output pixel values for the mask region further based, at least in part, on corresponding pixel values in the first image or the first masked synthetic SDOF image.

\* \* \* \* \*